Dec. 4, 1956 E. H. ARMSTRONG 2,773,125
MULTIPLEX FREQUENCY MODULATION TRANSMITTER
Filed Oct. 12, 1953 4 Sheets-Sheet 1

INVENTOR.
Edwin H. Armstrong

BY Moses, Nolte, Crews & Berry
ATTORNEYS

Fig. II.
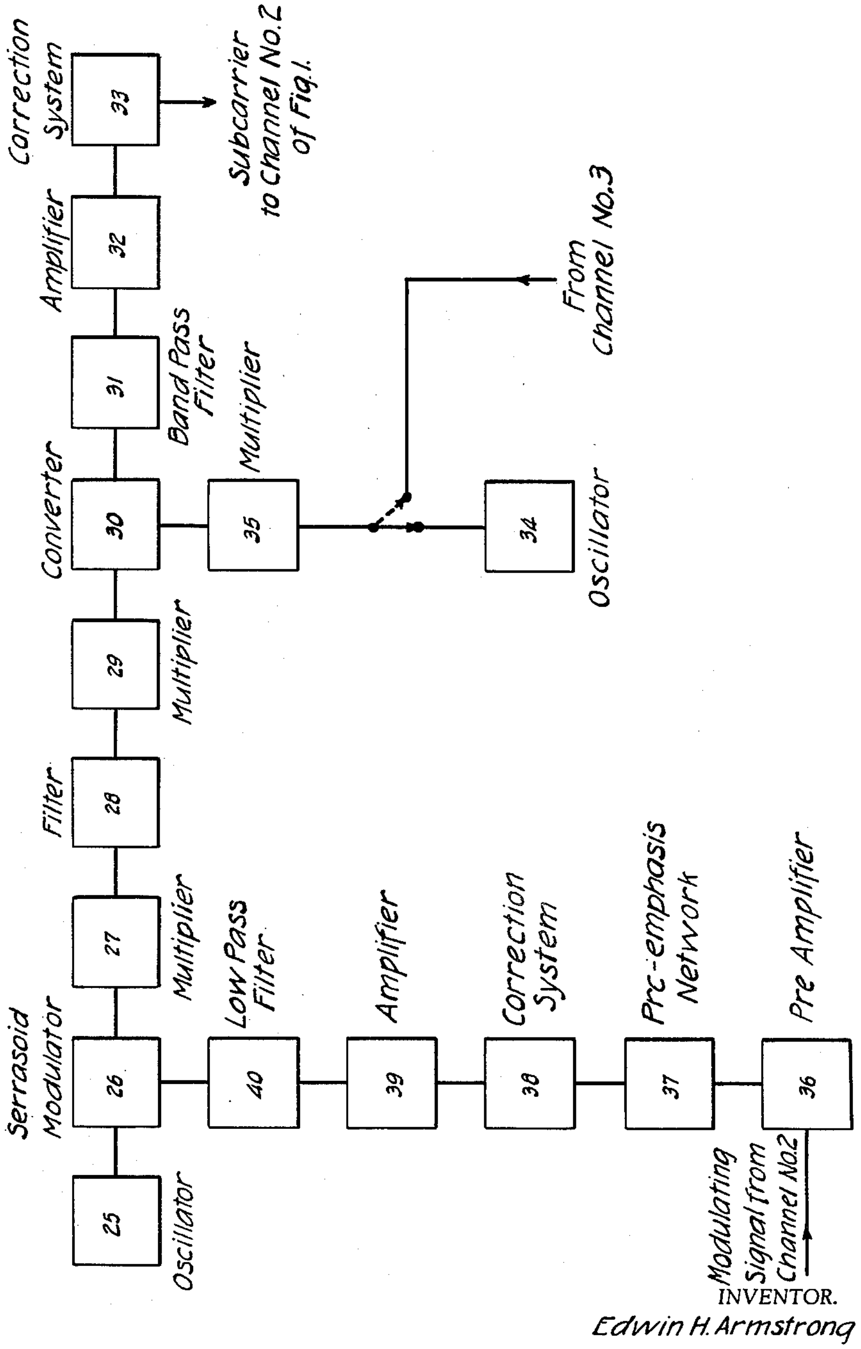
INVENTOR.
Edwin H. Armstrong
BY Moses, Nolte, Crews & Berry
ATTORNEYS Dec. 4, 1956 E. H. ARMSTRONG 2,773,125
MULTIPLEX FREQUENCY MODULATION TRANSMITTER
Filed Oct. 12, 1953 4 Sheets-Sheet 3
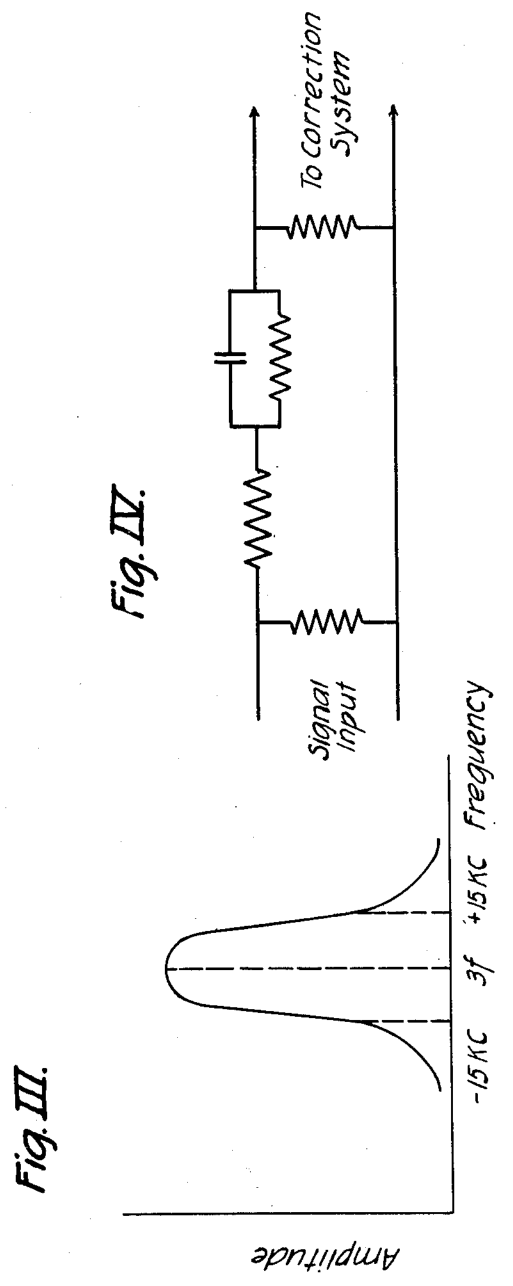
Fig. IV, Fig. III
INVENTOR.
Edwin H. Armstrong
BY Moses, Nolte, Crews & Berry
ATTORNEYS MULTIPLEX FREQUENCY MODULATION TRANSMITTER
Filed Oct. 12, 1953 4 Sheets-Sheet 4
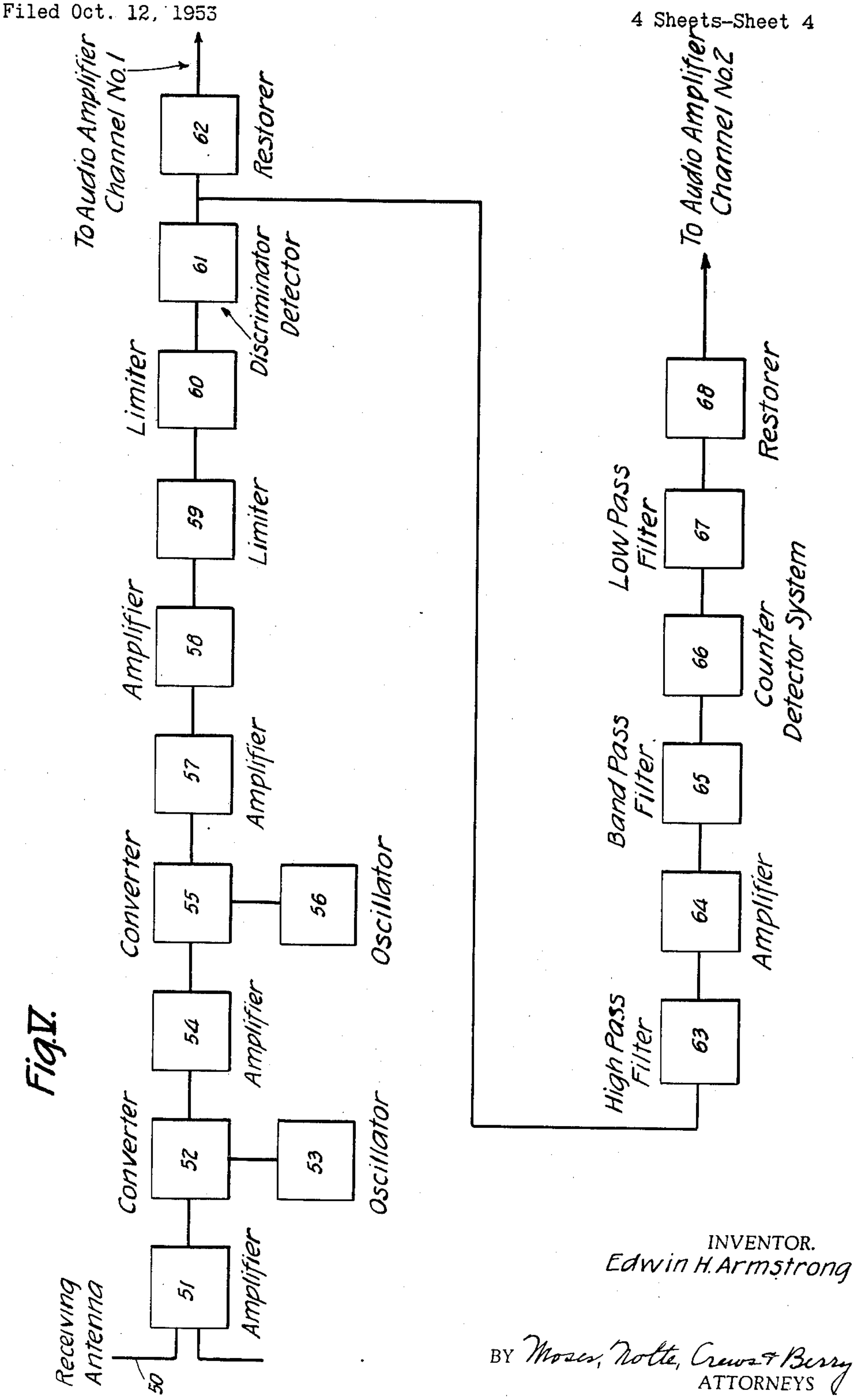
Fig.V.
INVENTOR.
Edwin H. Armstrong
BY Moses, Nolte, Crews & Berry
ATTORNEYS United States Patent Office 2,773,125
Patented Dec. 4, 1956

2,773,125

MULTIPLEX FREQUENCY MODULATION TRANSMITTER

Edwin H. Armstrong, New York, N. Y.; Esther M. Armstrong, executrix of said Edwin H. Armstrong, deceased Application October 12, 1953, Serial No. 385,483

2 Claims. (Cl. 179—15)

Figure 1:
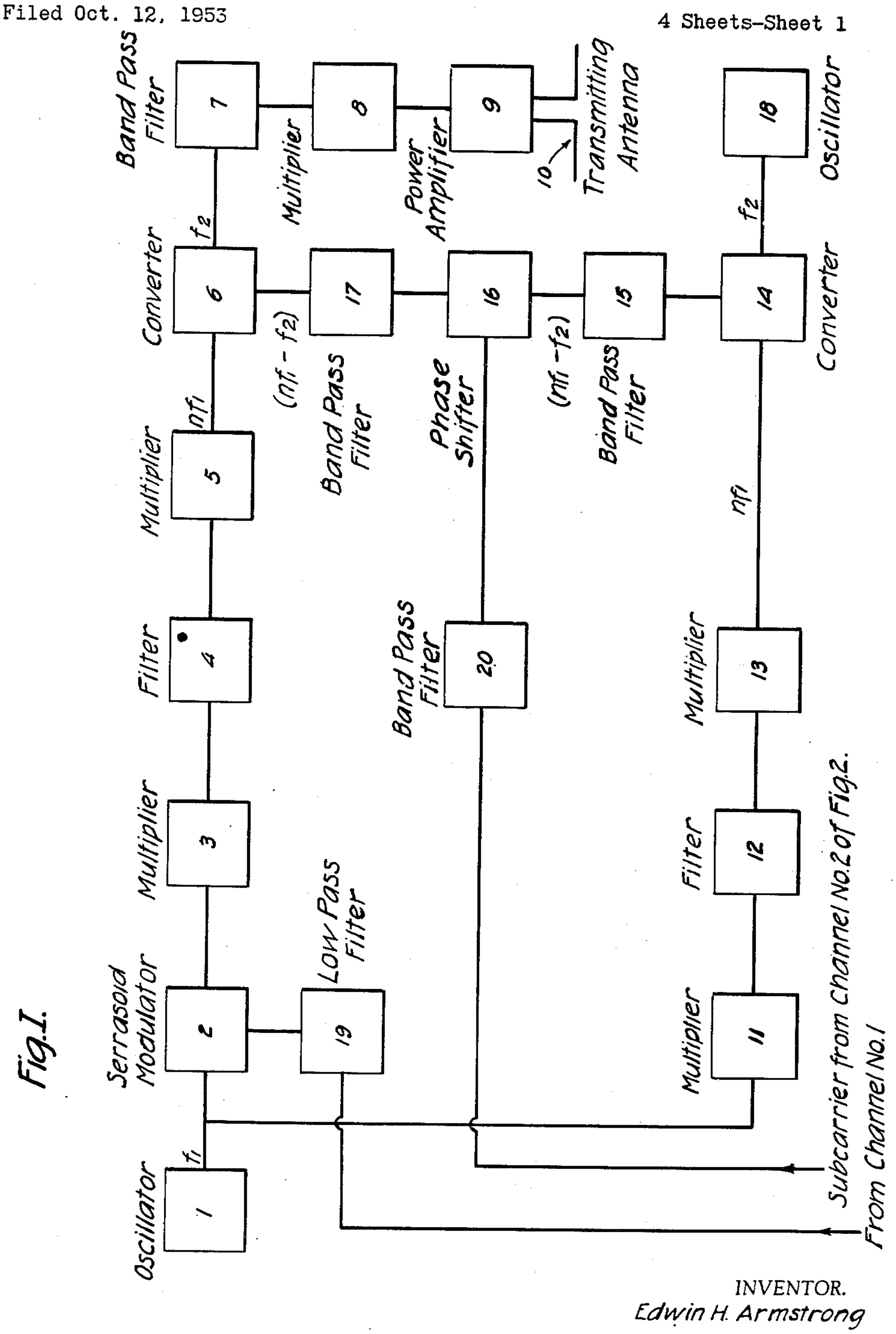

The invention relates to improvements in multiplex frequency modulation transmitters of the phase shift type. It has for its object the reduction of cross modulation among the channels and the exclusion from the higher frequency or subcarrier channels of noise generated in the circuits of the main channel. A further object of the invention is the provision of means whereby the frequency which the system is intended to radiate may be adjusted independently of the frequency of alignment and operation of the initial stages where the main channel modulation is carried out, so that the part of the system which must be accurately aligned and adjusted may be standardized for manufacture at one frequency, regardless of the particular frequency at which radiation takes place.

Referring to the accompanying drawing which forms a part of this specification:

Figure I is a schematic block diagram illustrating the general arrangement of the transmitter.

Figure II is a schematic block diagram showing means for providing a subcarrier which is supplied to Fig. I, the subcarrier being modified by a second or auxiliary channel with provision for connecting a third channel.

Figure III is a graph illustrating the transmission characteristic of a filter connected in the main channel portion of the transmitter.

Figure IV shows the circuit of a filter used for compensating for certain features of the transmission characteristic shown in Fig. III.

Figure V is a schematic block diagram showing receiving apparatus which is suitable for use in receiving the transmisisons from a transmitter arranged according to Figs. I and II.

Referring now to Fig. I, 1 represents an oscillator having a frequency $f_1$, 2 is a phase shift modulator preferably of the Serrasoid type, a preferred example of which is shown and described in U. S. Patent No. 2,566,826 issued on September 4, 1951, to James R. Day for a Sawtooth Frequency Modulator, 3 a frequency multiplier, 4 a filter having the characteristic illustrated in Fig. III of the drawing and arranged to operate in the manner described in U. S. patent application Serial No. 385,345 filed by John H. Bose, October 12, 1953, on even date herewith. Reference numeral 5 represents a frequency multiplier, 6 a converter, 7 a band pass filter, 8 another multiplier and 9, 10 a power amplifier and associated antenna for radiating the transmitted signal at the final frequency.

11 is a frequency multiplier, 12 a band pass filter, 13 a multiplier, 14 a converter, and 15 a band pass filter. 16 is a phase shifter of the type illustrated in my U. S. Patent #2,630,497 arranged to produce linearly a small phase shift, of the order of a few degrees only. 17 represents a band pass filter, and 18 an oscillator having a $f_2$ frequency which is an appropriate sub-multiple of the frequency which it is desired to radiate from antenna 10. 19 represents a low pass filter in the path of the modulating current for the phase shift modulator 2, and 20 a band pass filter in the path of the subcarrier auxiliary channel modulating current for the phase shift modulator 16 for the purpose of excluding currents of undesired frequencies from the two channels.

In general, the two multiplier chains, 3 and 5, and 11 and 13 will each have the same amount of multiplication $n$, so that the frequency supplied to the two converters 6 and 14 is in each instance $nf_1$. The arrangement of the two multiplier chains 3—6, and 11—14 are up to this point similar to the corresponding arrangement in my U. S. Patent #2,290,159.

The manner of operation will be understood from the following explanation. The original frequency $f_1$ the oscillator 1 is multiplied up $n$ times, which may in practice raise it to the order of megacycles, and the resulting frequencies $nf_1$ applied simultaneously to the converters 6 and 14 respectively. Each channel of multiplication is caused to pass a bandwidth as narrow as possible, consistent with passing the frequencies necessary for the purpose of its use. As explained in my U. S. Patent No. 2,630,497 the filter 4 excludes noise frequencies differing from the mid-frequency at that point in the main channel by an amount greater than that of the modulation frequency applied to the main channel. The second chain of multipliers 11—13 likewise contains a similar filter. The characteristics of the filters 4 and 12 may be as illustrated in Fig. III.

In converter 14 the frequency $nf_1$ is heterodyned with the frequency $f_2$ of oscillator 18 and the sum or difference frequency filtered out by the band pass filter 15. In the present example the difference frequency $(nf_1-f_2)$ is applied to the phase shifter 16 which may be of the type described in my U. S. Patent No. 2,630,497 since in general a phase shift of a few degrees only will be necessary. The frequency band $(nf_1-f_2)$ plus and minus the frequencies superimposed by the modulations of the auxiliary channel No. 2 is then heterodyned again in converter 6 and the multiplied frequency $nf_1$ cancelled out by selecting the difference frequency $$nf_1-(nf_1-f_2)=f_2$$

by means of the band pass filter 7. The frequency $f_2$ as modified by the modulations of both channels is then multiplied up to the final radiated frequency by the multiplier 8 which is arranged to be a sufficiently broad band system so that cross modulation between the channels, which is the principal difficulty encountered in successful multiplex working, is held to a desired minimum.

Turning now to Fig. II there is illustrated a schematic arrangement of the means for obtaining the frequency modulated subcarriers to be applied to the phase shifter 16 for impressing the subcarrier modulations on the transmitted wave. In this figure, 25 represents an oscillator of an appropriate frequency, 26 a phase modulator, 27 a frequency multiplier which may conveniently be a tripler, 28 a filter for removing disturbing frequencies beyond the range of the modulating frequency band, and 29 a multiplier for raising the frequency swing to any selected value of subcarrier frequency swing. 30 represents a converter which may conveniently be of a balanced and linear type to minimize distortion and 34 and 35 an oscillator multiplier combination for producing a heterodyning current to beat down to any selected subcarrier value the frequency of the modulated current supplied to the converter from the multiplier 29. 31 represents a band pass filter for restricting the band of modulating frequencies to be applied to the modulation of the main carrier. This filter has the additional purpose of protecting the main channel from the intrusion of any frequencies which may be inadvertently produced outside the desired modulation range in the auxiliary modulation channel. 32 represents an amplifier and 33 a correction system of the usual characteristic to insure a uniform modulation swing with respect to frequency for the phase shift modulator 16.

The modulation means for the auxiliary channel are provided by a source of modulation voltage applied thru a pre-amplifier 36, a pre-emphasis network 37, the usual correction system 38 that precedes a phase shift modulator, an amplifier 39 and a L. P. filter 40 for limiting the top frequency that can be applied to the modulator 26.

Additional subcarrier channels may be applied by duplicating the arrangement of Fig. II at a subcarrier frequency properly spaced above the subcarrier of the second channel and applied simultaneously to the modulator 16. The additional channel may also be cut in by substituting it for the oscillator 34 as illustrated in the diagram of Fig. II. The filter 28 may also be arranged to have a characteristic similar to that of Fig. III and the modulating current characteristic corrected by inserting a network such as shown in Fig. IV.

Referring now to Fig. III and to Fig. IV there are illustrated respectively the characteristics of the filter 4 of Fig. I and the diagram of a compensation network with a rising frequency characteristic which is employed in the modulating chain to neutralize the attenuating effect of the filter at the higher frequencies. The effect of this combination to reduce noise and cross modulation between channels is described in the co-pending application of John H. Bose, Serial No. 385,345 referred to above.

Fig. V illustrates the general arrangement of the receiving system which may be employed for separating the two or more channels which may be transmitted by the arrangement of Figs. I and II.

In Fig. V, 50 represents the receiving antenna and 51 to 60 represents a double I. F. superheterodyne with limiters 59 and 60 arranged in the usual way for F. M. reception. 61 represents a discriminator detector of the phase shift type and 62, the usual restorer. This completes the equipment necessary for channel 1 except that under certain circumstances a low pass filter may be included in the amplifier circuit to remove the super audible frequency to a greater extent than the restorer is able to remove it.

The second channel comprises a high pass filter 63, amplifier 64, band pass filter 65 and counter type detector system 66 which also includes limiting means. A low pass filter 67 removes the high level peaks of the counter system and the usual restorer 68 completes the apparatus necessary to recreate the modulations of channel No. 2.

Instead of the counter detector system 66 there may also be employed a phase delay detection system of the type described in the co-pending application of John H. Bose for U. S. Patent Serial No. 385,482, filed October 12, 1953, for a Linear Detector for Subcarrier Frequency Modulated Waves with improved results with respect to the elimination of cross modulation effects.

I have described what I believe to be the best embodiment of my invention. I do not wish, however, to be confined to the embodiments shown, but what I desire to cover by Letters Patent is set forth in the appended claims.

I claim:

1. A frequency modulation multiplex transmitter for a main channel and at least one auxiliary channel, said transmitter comprising: a first oscillator; a main channel phase shift modulator supplied with current derived from said first oscillator and having an input for the modulating signal of the main channel; an auxiliary phase shift modulator having a modulation input for the modulating signal of the auxiliary channel; circuit means supplying said auxiliary phase shift modulator with current derived from said first oscillator, said circuit means including a first frequency multiplier and a first converter; a second oscillator coupled to said first converter and altering the frequency of the current supplied by said circuit means by a submultiple of the frequency to be transmitted; a second converter coupled to the output of said auxiliary channel modulator; a second frequency multiplier connected between the output of said main channel modulator and said second converter and having the same factor of multiplication as said first frequency multiplier; a filter connected to the output of said second converter and having a characteristic which selects from the output of said second converter the frequency of said second oscillator modified by the modulations of said main and auxiliary modulators; and further frequency multiplying means coupled to the output of said filter for multiplying said modulated second oscillator frequency up to said frequency to be transmitted by said transmitter.

2. A transmitter according to claim 1, further comprising a band pass filter interposed between said second converter and said output of said auxiliary channel modulator.

References Cited in the file of this patent

UNITED STATES PATENTS

| | | |
|---|---|---|
| 2,169,212 | Armstrong | Aug. 15, 1939 |
| 2,233,183 | Roder | Feb. 25, 1941 |
| 2,290,159 | Armstrong | July 21, 1942 |
| 2,511,204 | Goldstine | June 13, 1950 |